United States Patent [19]

Slocum et al.

[11] Patent Number: 4,917,902
[45] Date of Patent: Apr. 17, 1990

[54] MOLD FOR THE PREPARATION OF REINFORCED REACTION INJECTION MOLDED PRODUCTS

[75] Inventors: Gregory H. Slocum, Pittsburgh; Michael F. Hurley, Oakdale; Wallace D. Templin, Coraopolis; Donald W. Schumacher, Bethel Park, all of Pa.

[73] Assignee: Mobay Corporation, Pittsburgh, Pa.

[21] Appl. No.: 329,729

[22] Filed: Mar. 28, 1989

[51] Int. Cl.$^4$ .............................................. B29C 45/34
[52] U.S. Cl. .................................. 425/553; 425/406; 425/420; 425/812
[58] Field of Search ............... 425/394, 395, 401, 406, 425/408, 420, 806, 812, 806 R, DIG. 51, 553, 589

[56] References Cited

U.S. PATENT DOCUMENTS

| | | | |
|---|---|---|---|
| 912,284 | 2/1909 | Collins | 425/394 |
| 1,654,001 | 12/1927 | Howard | 425/394 |
| 1,680,823 | 8/1928 | Teed | 425/806 R |
| 2,478,165 | 8/1949 | Collins | 425/394 |
| 3,529,321 | 9/1970 | Culand | 425/406 |
| 4,751,029 | 6/1988 | Swanson | 425/394 |
| 4,792,576 | 12/1988 | Nodelman | 521/174 |

FOREIGN PATENT DOCUMENTS

| | | | |
|---|---|---|---|
| 60-149421 | 8/1985 | Japan | 425/406 |
| 808443 | 2/1959 | United Kingdom | 425/420 |
| 2141372 | 12/1984 | United Kingdom | 425/408 |

OTHER PUBLICATIONS

"Reaction Injection Molding", edited by W. E. Becker, Van Nostrand Reinhold Co., 1979, pp. 81, 90, 234-235.

Primary Examiner—Jay H. Woo
Assistant Examiner—C. Scott Bushey
Attorney, Agent, or Firm—Joseph C. Gil

[57] ABSTRACT

The mold broadly consists of an upper and lower mold part. The parts define a mold cavity when the mold is in the closed position. A channel is provided in one of the parts, with the channel completely surrounding the cavity. One upper edge of the channel forms at least a portion of the outer edge of the mold cavity. The channel is at least partially filled with an elastomeric material. A shear plate is attached to the other part in a location opposite the channel. When the mold is in the closed position, the shear plate enters the channel, presses against the elastomeric material and presses against the outer edge of the mold cavity. The shear plate is also provided with one or more tapered slots which allow gases to escape from the mold cavity when the mold is in the closed position.

2 Claims, 2 Drawing Sheets

MOLD FOR THE PREPARATION OF REINFORCED REACTION INJECTION MOLDED PRODUCTS

BACKGROUND OF THE INVENTION

Recently there has been much interest in the preparation of so-called "structural RIM" parts. Typically such parts are made by laying a glass fiber mat in a mold and introducing polyurethane or polyurea reactants into the mold via the reaction injection molding ("RIM") process. A particularly preferred RIM formulation is described in U.S. Pat. No. 4,792,576. Previously, the molds used to produce such parts utilized a metal-to-metal seal to prevent loss of materials during the process. However, even with good mold clamping pressures, the relatively low viscosity reaction components flowed between the seal giving the flash that is typical to RIM molding. A discussion of the flash phenomenon can be found in the book entitled "Reaction Injection Molding", edited by W.E. Becker, Van Nostrand Reinhold Company, 1979, pages 81, 90, and 234–235.

In addition, in those cases where the glass mat had not been cut to the exact shape of the mold, the reaction components flow preferentially along the edge of the part, rather than through the glass mat. This phenomenon leads to the formation of voids in the final part and to improperly filled molds.

DESCRIPTION OF THE INVENTION

The present invention is directed to a mold for the preparation of reinforced reaction injection molded products which overcomes the above noted problems. More particularly, the present invention is directed to a mold for the production of reinforced reaction injection molded products comprising:
(i) an upper mold part,
(ii) a lower mold part, said parts having surface portions defining the interior of a mold cavity when said mold is in the closed position,
(iii) a first channel in one of said parts completely surrounding said cavity, one upper edge of said channel forming at least a portion of the outer edge of said cavity, and wherein said channel is at least partially filled with an elastomeric material, and
(iv) a first shear plate attached to the other of said parts in a location opposite said channel, wherein when said mold is in the closed position, said first shear plate;
(a) enters said first channel,
(b) presses against said elastomeric material, and
(c) presses against said outer edge,
said first shear plate having one or more tapered slots therein said slots: (1) tapering down from the surface of said first plate which is adapted to press against said elastomeric material, and (2) being capable of allowing gases to escape from said cavity when said mold is in the closed position.

In one particularly preferred embodiment, the part having the first shear plate attached thereto has a second channel completely surrounding the shear plate, with the second channel also being at least partially filled with an elastomeric material. A second shear plate is then attached to the other part in a location opposite the second channel. In the closed position, the second shear plate enters the second channel, and presses against the elastomeric material therein.

In another preferred embodiment, a metal insert is attached to the part having the first channel such that the upper edge of the channel corresponds to the outer edge of the insert.

Figure 1:
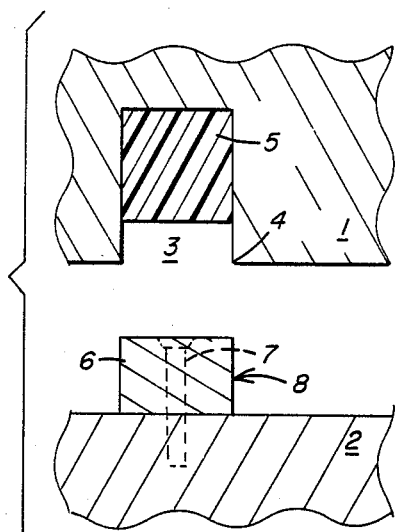
FIG. 1 represents a first embodiment of a mold of the present invention, with the mold in the open position.

Reference will now be made to the drawings. In FIG. 1, the upper mold half is represented by the number 1, while the lower mold half is represented by the number 2. In the closed position, a mold cavity 9 is formed (note FIG. 2). As is known in the art, the size of the mold cavity is determined by mold stops (not shown). For example, referring to FIG. 2, the cavity size could be determined by placement of a mold stop around the cavity to the left of the plate 8. In operation, a glass fiber mat is first laid on the lower surface of the mold. The mold is then closed and the polyurethane or polyurea reactants are then injected into the mold. The reactants are allowed to react in the mold. Upon completion of the reaction, the mold is opened and the final part is removed. In FIG. 1, the upper mold part is shown as having a channel 3 therein, which channel completely surrounds the mold cavity. One upper edge 4 of the channel at least partially forms the outer edge of the mold cavity. An elastomeric material 5 at least partially fills the channel 3. Useful elastomeric materials include a broad range of materials. The general properties required include low compression set, a non-porous surface to enable ease of release of any molding flash, and the ability to withstand conventional mold temperatures for the particular reaction components chosen. Typically, the molding temperatures will be in the range of from 120° to 250° F. In addition, the elastomer must be resistant to typical mold release carriers (generally aliphatic and alcohol solvents are used) and to the reactants used. Ideally, the elastomer would be compressible. Specific useful materials include room temperature vulcanizable silicone resins, neoprene rubbers, and urethane elastomers.

Figure 2:
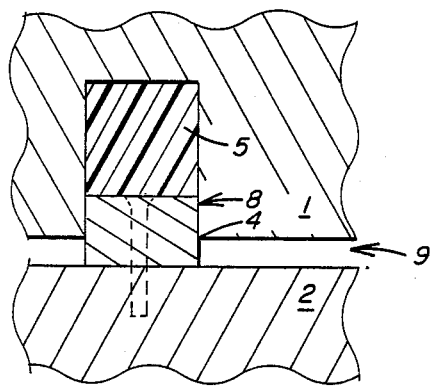
FIG. 2 is a drawing of the mold of FIG. 1 in the closed position.

In the mold part opposite the channel is fixed a shear plate 6. The shear plate may be fixed to the mold part via any suitable means, and is shown as being bolted via bolt 7 in the drawings. One side 8 of the shear plate acts as a shearing edge in combination with the edge 4 of the other mold part when the mold is closed. As shown in FIG. 2, when the mold is closed, the shear plate 6 passes into the channel 3, presses against the elastomeric material 5, and presses against the edge 4. In operation, the shear plate will cut off any excess glass mat extending beyond the mold cavity.

Figure 3:
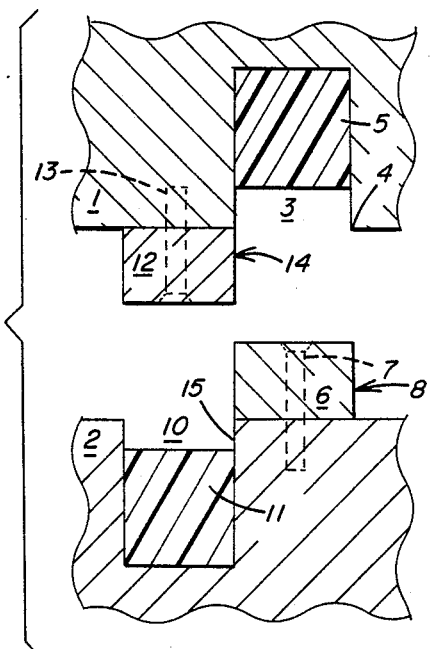
FIG. 3 represents a second embodiment of a mold of the present invention in the open position.

FIG. 3 represents a second embodiment according to the present invention. In this embodiment, the lower part is also provided with a channel 10 which is at least partially filled with an elastomeric material 11, which is of the same type as used in FIG. 1. The elastomeric material in this channel may be in the form of an O-ring.

In the opposite mold part, a corresponding shear plate 12 is provided. The plate 12 may be fixed to the mold part via bolt 13. In effect, the second channel and shear plate form a back-up seal. In operation, the second shear plate passes into the second channel and presses against the elastomeric material therein. One particular advantage of this embodiment is that the shear plate 12 is removable and can be replaced with a different size plate depending upon the thickness of the product to be produced.

Figure 4:
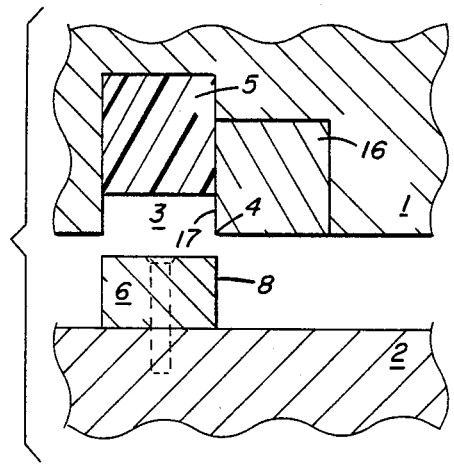
FIG. 4 represents another embodiment of a mold of the present invention in the open position.

In FIG. 4, the mold part having the first channel has attached thereto a shear plate 16. The outer surface 17 of the plate 16 forms a portion of the channel 3. One edge 4 of the plate forms the shearing edge in operation.

Figure 5:
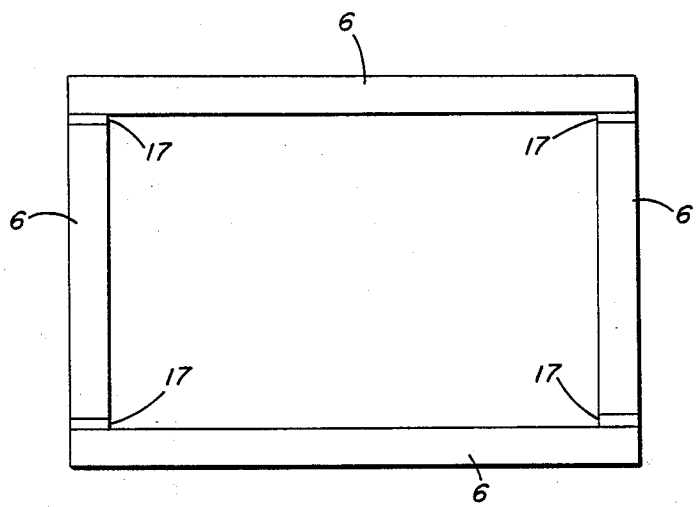
FIG. 5 is a top view of a mold part which has a shear plate attached thereto, showing positioning of mold vents.
Figure 6:
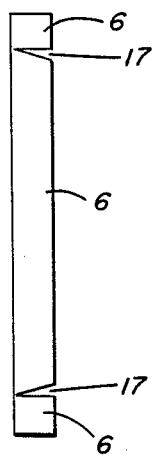
FIG. 6 is a side view of the mold part of FIG. 5.

As is known in the RIM art, the reaction mixture, which only partially fills the mold cavity during the injection cycle, expands to fill the cavity and displaces the air present in the cavity. Therefore, the air must have an escape route. Referring to FIGS. 5 and 6, the shear plate 6 is provided with one or more vents 17. The vents are in the form of tapered slots which taper down from the surface which will contact the elastomeric material. When the mold is closed, gasses will escape through that portion of the vent(s) which is not blocked by the mold wall.

Regardless of the particular arrangement chosen, and while the shear plates can be constructed of substantially any metal, it is generally preferred that the shear plates be constructed from high absorption resistance tool steels. All molybdenum type high speed tool steels in the AISI 4 series are useful. Excellent results have been attached using AISI 4140 and AISI 4150.

When using the mold of the present invention, several advantages have been observed:
(a) the reactants completely fill the cavity of the mold without flashing significantly through the seal formed by the first channel and first shear plate;
(b) the surface appearance of the molded parts is improved and a lower incidence of surface porosity is observed; and
(c) the glass mat extends completely to the edges of the final product, thereby eliminating the previous condition of resin-rich edges.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A mold for the production of reinforced reaction injection molded products, said mold having an open and a closed position and comprising:
   (i) an upper mold part,
   (ii) a lower mold part, said parts having surface portions defining the interior of a mold cavity when said mold is in the closed position,
   (iii) a first channel in one of said parts completely surrounding said cavity, one upper edge of said channel forming at least a portion of the outer edge of said cavity, sand wherein said channel is at least partially filled with an elastomeric material, and
   (iv) a first shear plate attached to the other of said parts in a location opposite said channel, wherein when said mold is in the closed position, said first shear plate:
      (a) enters said first channel,
      (b) presses against said elastomeric material, and
      (c) presses against said outer edge,
   said first shear plate having one or more tapered slots therein, said slots; (1) tapering down from the surface of said first plate which presses against said elastomeric material, and (2) allowing gases to escape from said cavity when said mold is in the closed position.

2. The apparatus of claim 1 wherein the mold part having the first shear plate attached thereto has a second channel therein completely surrounding said first shear plate, with said second channel being at least partially filled with an elastomeric material, and wherein a second shear plate is attached to the other mold part in a location opposite said second channel.

* * * * *